(12) United States Patent
Keyser et al.

(10) Patent No.: US 7,823,277 B2
(45) Date of Patent: Nov. 2, 2010

(54) PRE-NESTING OF THE ACTIVE AREA ON PLATES TO REDUCE THICKNESS VARIATION

(75) Inventors: Mark W. Keyser, Bloomfield, NY (US);
Jeffrey A. Rock, Fairport, NY (US);
Keith E. Newman, Pittsford, NY (US);
Lewis Dipietro, West Henrietta, NY (US); Scott Ofslager, Albion, NY (US);
Steven J. Spencer, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 140 days.

(21) Appl. No.: 12/022,694

(22) Filed: Jan. 30, 2008

(65) Prior Publication Data

US 2009/0188099 A1     Jul. 30, 2009

(51) Int. Cl.
*H01R 9/00* (2006.01)
*H05K 3/00* (2006.01)

(52) U.S. Cl. .................... 29/843; 29/623.1; 29/830; 29/831; 29/842; 903/908; 429/34; 429/18

(58) Field of Classification Search ............ 903/908; 29/623.1, 830, 831, 842, 843; 429/34–41, 429/18
See application file for complete search history.

(56) References Cited

U.S. PATENT DOCUMENTS

| | | | | |
|---|---|---|---|---|
| 5,268,241 | A | * | 12/1993 | Meacham .................. 429/460 |
| 6,974,648 | B2 | | 12/2005 | Goebel |
| 2004/0151975 | A1 | * | 8/2004 | Allen .......................... 429/38 |
| 2005/0100771 | A1 | * | 5/2005 | Vyas et al. ................... 429/32 |
| 2006/0046130 | A1 | * | 3/2006 | Lai .............................. 429/38 |
| 2006/0127706 | A1 | | 6/2006 | Goebel et al. |

* cited by examiner

*Primary Examiner*—Derris H Banks
*Assistant Examiner*—Jeffrey Carley
(74) *Attorney, Agent, or Firm*—Fraser Clemens Martin & Miller LLC; J. Douglas Miller (57) ABSTRACT

A method for preparing a bipolar plate assembly for a fuel cell stack is provided. The method first includes the steps of providing a first unipolar plate having a first active area with a plurality of channels formed on a first inner surface thereof, and a second unipolar plate having a second active area with a plurality of lands formed on a second inner surface thereof. The first unipolar plate and the second unipolar plate are aligned to dispose the first active area adjacent the second active area. A first pressure is then applied to the first and second active areas to pre-nest the first active area and the second active area. The perimeters of the first and second unipolar plates are then joined. A clamping fixture and associated method for assembling the bipolar plate assembly is also provided.

12 Claims, 5 Drawing Sheets

PRE-NESTING OF THE ACTIVE AREA ON PLATES TO REDUCE THICKNESS VARIATION

FIELD OF THE INVENTION

The present disclosure relates to fuel cell stacks and, more particularly, to a bipolar plate assembly and methods for preparing bipolar plates for fuel cell stacks.

BACKGROUND OF THE INVENTION

A fuel cell has been proposed as a clean, efficient and environmentally responsible power source for various applications. In particular, individual fuel cells can be stacked together in series to form a fuel cell stack capable of generating a quantity of electricity sufficient to power an electric vehicle.

One example of the fuel cell is a Proton Exchange Membrane (PEM) fuel cell. The PEM fuel cell includes a membrane-electrode-assembly (MEA) that generally has a thin, solid polymer membrane-electrolyte having an anode and a cathode with a catalyst on opposite faces of the membrane-electrolyte. The MEA is generally disposed between a pair of porous conductive materials, also known as gas diffusion media, which distribute gaseous reactants, e.g. hydrogen and oxygen/air, to the anode and cathode layers. Collectively, the MEA and the gas diffusion media are known as "softgoods". The hydrogen reactant is introduced at the anode where it reacts electrochemically in the presence of the catalyst to produce electrons and protons. The electrons are conducted from the anode to the cathode through an electrical circuit disposed therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product.

The softgoods of the PEM fuel cell are sandwiched between a pair of electrically-conductive bipolar plates which serve as current collectors for the anode and cathode layers. The bipolar plates include a plurality of lands and flow channels for distributing the gaseous reactants to the anodes and cathodes of the fuel cell. The bipolar plates serve as an electrical conductor between adjacent fuel cells and are further provided with a plurality of internal channels adapted to exchange heat with the fuel cell when a coolant flows therethrough. The typical bipolar plate is a joined assembly constructed from two separate unipolar plates. Each unipolar plate has an exterior surface having flow channels for the gaseous reactants and an interior surface with the internal coolant flow channels. In order to conduct electrical current between the anodes and cathodes of adjacent fuel cells in the fuel cell stack, the paired unipolar plates forming each bipolar plate assembly are mechanically and electrically joined.

A typical bipolar plate assembly design is known as a "nested" configuration. In the nested configuration, the channels and lands formed on the interior surfaces of the respective unipolar plates are aligned and mated. Nonlimiting examples of nested configurations are described in U.S. Pat. No. 6,974,648 and in U.S. Pat. App. Pub. No. 2006/0127706, the disclosures of which are incorporated herein by reference in their entireties. A known method of preparing a bipolar plate assembly having a nested configuration includes clamping a pair of unipolar plates with matching channeled regions around a perimeter of the unipolar plates. A pressure is applied to the perimeters of the unipolar plates, for example, with dead weight or clamps. The perimeter is welded to seal bipolar plate assembly.

The bipolar plate assembly is known to occasionally exhibit an undesirable variation in thickness across a surface area of the bipolar plate assembly. Thickness variation across the bipolar plate assembly generally results from an improper nesting of the channels and lands of the unipolar plates when assembled to form the bipolar plate assembly. The improper nesting may, in part, be due to differences in lateral springback of the unipolar plates, whereby one unipolar plate may have a greater amount of lateral springback due to dimensional differences following a forming thereof, for example, by a stamping operation. The thickness variation may manifest itself as a "trapped wave" of material within the nested regions of the bipolar plate assembly, particularly when any excess or slack material is present when the perimeters of the unipolar plates are constrained. The trapped wave of material may result in a gap or a separation between the unipolar plates.

Spot welding the unipolar plates together within the active area is one known approach to providing a low resistance to electron flow through the bipolar plate assembly. However, the abovementioned separation between the unipolar plates may present difficulties in spot welding within the active area of the bipolar plate assembly. Attempting to weld at a location where a separation exists causes a perforation in the unipolar plate. The perforation forms a leak path for fluids in the fuel cell stack. The separation between the unipolar plates is therefore undesirable.

Testing has shown that the final nesting of the channeled regions is substantially completed under the build loads associated with assembly of the fuel cell or fuel cell stack. Under these compressive forces, the channels and lands are eventually "seated" together. However, the employment of fuel cell compression to complete the nesting of the channeled regions results in undesirable localized stresses on the softgoods. Both variation in bipolar plate thickness and uneven distribution of softgood stresses is known to negatively affect fuel cell performance. Non-nested regions, in particular, may cause an undesirable level of compression under typical stack loads. The undesirable level of compression, combined with other factors such as temperature and humidity, may lead to electrical shorts through the PEM of the fuel cell.

There is a continuing need for a method and assembly fixture for reducing a variation in thickness of the bipolar plate assembly. Desirably, the method militates against an improper nesting of the unipolar plates during assembly of the bipolar plate.

SUMMARY OF THE INVENTION

In concordance with the instant disclosure, a method and assembly fixture for reducing a variation in thickness of the bipolar plate assembly and militating against an improper nesting of the unipolar plates during assembly of the bipolar plate assembly, is surprisingly discovered.

In one embodiment, a method for preparing a bipolar plate assembly for a fuel cell stack first includes the steps of providing a first unipolar plate having a first active area with a plurality of channels formed on a first inner surface thereof, and a second unipolar plate having a second active area with a plurality of lands formed and a second inner surface thereof. The first unipolar plate and the second unipolar plate are aligned to dispose the first active area adjacent the second active area. A first pressure is then applied to the first and second active areas to pre-nest the plurality of channels with the plurality of lands. A first perimeter flange of the first unipolar plate and a second perimeter flange of the second unipolar plate are subsequently joined. The pre-nested bipolar plate assembly is thereby provided.

In another embodiment, a clamping fixture for assembly of a bipolar plate for a fuel cell stack is provided. The clamping fixture includes a base plate. The base plate is adapted to receive a first unipolar plate with a first active area and a first perimeter flange and a second unipolar plate with a second active area and a second perimeter flange. The clamping fixture also includes a top plate assembly. The top plate assembly is coupled to the base plate and adapted to apply stepwise a first pressure to the active areas and a second pressure to the perimeter flanges of the first and second unipolar plates.

In a further embodiment, a method of using the clamping fixture is provided. The method includes the steps of providing the clamping fixture and placing the first and second unipolar plates on the base plate, thereby aligning the first active area adjacent the second active area. The first pressure is then applied to the first and second active areas with the top plate assembly of the clamping fixture. The plurality of channels is thereby pre-nested with the plurality of lands. A second pressure is then applied to the first and second perimeter flanges with the top plate assembly of the clamping fixture. The first perimeter flange of the first unipolar plate is joined to the second perimeter flange of the second unipolar plate, thereby preparing the bipolar plate assembly.

DRAWINGS

The above, as well as other advantages of the present disclosure, will become readily apparent to those skilled in the art from the following detailed description, particularly when considered in the light of the drawings described hereafter.

FIG. 2b is an exploded perspective view of the bipolar plate assembly depicted in FIG. 2a;

FIG. 2c is a fragmentary, cross-sectional view of the bipolar plate assembly taken along section line C—C in FIG. 2a;

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 1:
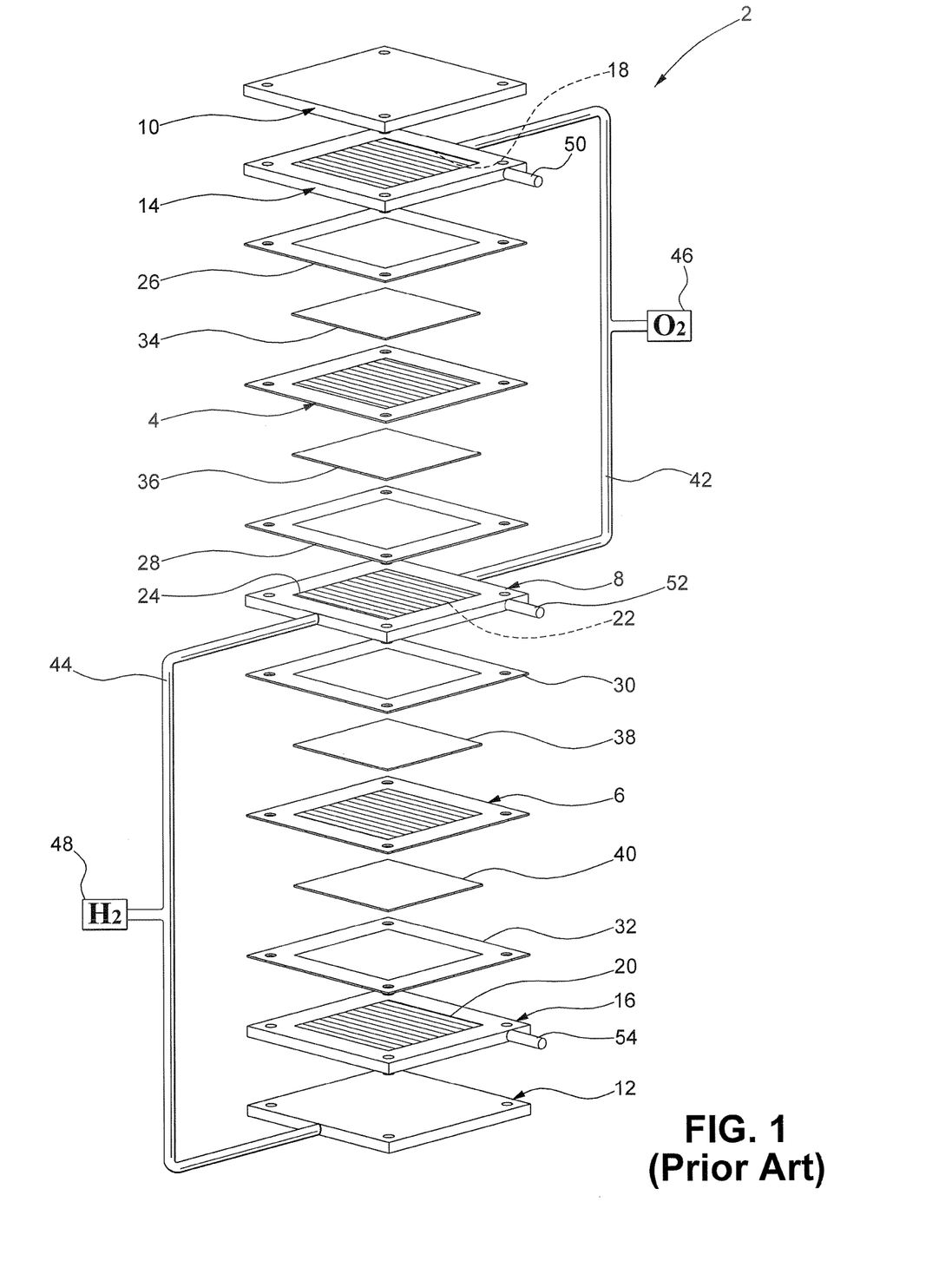
FIG. 1 illustrates a schematic, exploded perspective view of a PEM fuel cell stack of the prior art (showing only two cells)

For simplicity, only a two-cell stack (i.e. one bipolar plate) is illustrated and described herein, it being understood that a typical stack will have many more such cells and bipolar plates. FIG. 1 depicts a two cell PEM fuel cell stack 2 having a pair of membrane-electrode-assemblies (MEAs) 4, 6 separated from each other by an electrically conductive fluid distribution element 8, hereinafter bipolar plate assembly 8. The MEAs 4, 6 and bipolar plate assembly 8, are stacked together between end plates 10, 12, and end contact elements 14, 16. The end contact elements 14, 16 and the bipolar plate assembly 8 include working faces 18, 20, 22, 24, respectively, for distributing fuel and oxidant gases (e.g., H2 and O2) to the MEAs 4, 6. Nonconductive gaskets 26, 28, 30, 32 provide seals and electrical insulation between the several components of the fuel cell stack 2.

The MEAs 4, 6 are disposed adjacent gas permeable conductive materials known as gas diffusion media 34, 36, 38, 40. The gas diffusion media 34, 36, 38, 40 may include carbon or graphite diffusion paper. The gas diffusion media 34, 36, 38, 40 contact the MEAs 4, 6. The end contact units 14, 16 contact the gas diffusion media 34, 40 respectively. The bipolar plate assembly 8 contacts the gas diffusion media 36 adjacent the anode face of MEA 4, configured to accept hydrogen-bearing reactant. The bipolar plate assembly 8 also contacts gas diffusion medium 38 adjacent the cathode face of MEA 6, configured to accept oxygen-bearing reactant. Oxygen is supplied to the cathode side of the fuel cell stack 2 from storage tank 46, for example, via an appropriate supply conduit 42. Hydrogen is supplied to the anode side of the fuel cell from a storage tank 48, for example, via an appropriate supply conduit 44. Alternatively, ambient air may be supplied to the cathode side as an oxygen source and hydrogen to the anode from a methanol or gasoline reformer, and the like. Exhaust conduits (not shown) for both the anode and cathode sides of the MEAs 4, 6 are also provided. Additional conduits 50, 52, 54 are provided for supplying coolant to the bipolar plate assembly 8 and end plates 14, 16. Appropriate conduits for exhausting the coolant from the bipolar plate assembly 8 and end plates 14, 16 are also provided (not shown).

Figure 2A:
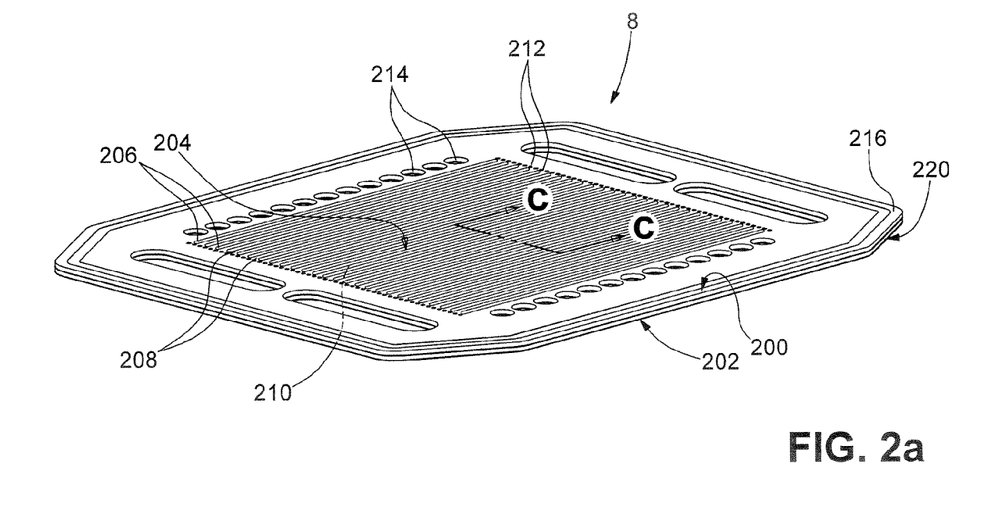
FIG. 2a is a perspective view of a joined bipolar plate assembly according to an embodiment of the present disclosure.
Figure 2B:
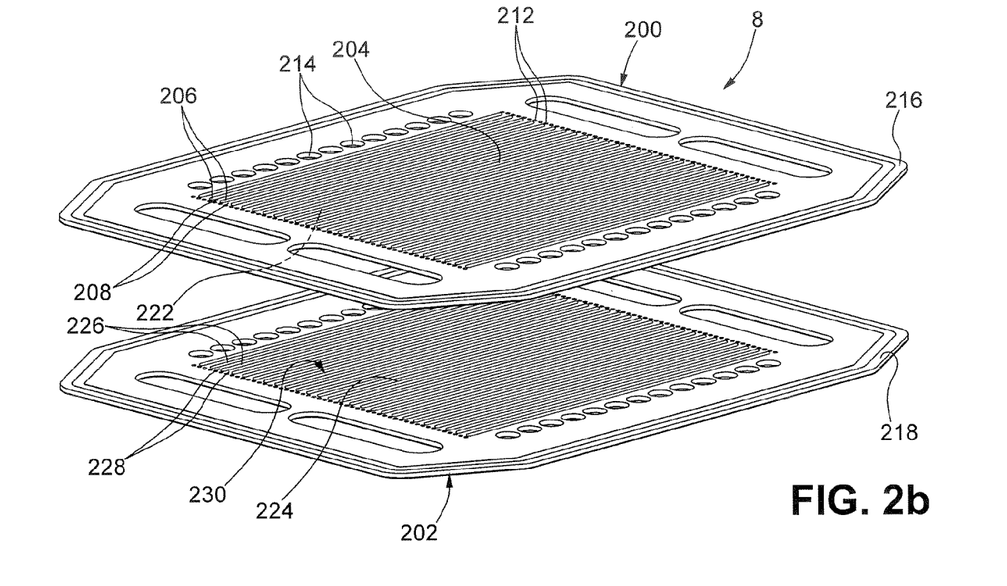

Referring next to FIGS. 2a and 2b, the bipolar plate assembly 8 of the present disclosure is shown in greater detail. The bipolar plate assembly 8 includes a first unipolar plate 200 and a second unipolar plate 202. The first unipolar plate 200 has a first active area 204 with a plurality of first flow channels 206 formed therein. The plurality of first flow channels 206 is adapted to distribute the fuel and oxidant gases across the first active area 204. The plurality of first flow channels 206 define a plurality of lands 208 disposed therebetween. Similar pluralities of second flow channels and second lands are formed on a second active area 210 of the second unipolar plate 202.

The first and second unipolar plates 200, 202 are formed from an electrically conductive material. Suitable electrically conductive materials include, for example, a metal, a metal alloy, and a composite material. The metals, metal alloys, and composite materials have sufficient durability and rigidity to function as sheets in the bipolar plate assembly 8 of the fuel cell stack 2. Additional design properties considered in selecting a material for the unipolar plates 200, 202 may include gas permeability, conductivity, density, thermal conductivity, corrosion resistance, pattern definition, thermal and pattern stability, machinability, joinability, and availability. Suitable metals and metal alloys include, but are not limited to, aluminum, titanium, platinum, stainless steel, carbon steel, nickel-based alloys, tantalum, niobium, and alloys and combinations thereof. Composite materials include, but are not limited to, graphite, graphite foil, conductive particles (e.g. graphite powders) in a polymer matrix, carbon fiber paper and polymer laminates, polymer plates with metal cores, conductively coated polymer plates, and combinations thereof, for example.

The first and second unipolar plates 200, 202 are typically thin. For example, the first and second unipolar plates 200, 202 may have a thickness of about 0.05 mm to about 0.5 mm. It should be understood that other thicknesses may be used as desired. The first and second unipolar plates 200, 202 can be formed by any method known in the art including machining, molding, cutting, carving, stamping, photo-etching such as through a photolithographic mask, or any other suitable design and manufacturing process. It is contemplated that the unipolar plates 200, 202 may include a laminate structure having a flat sheet and an additional sheet including a series of external fluid flow channels.

Figure 2C:
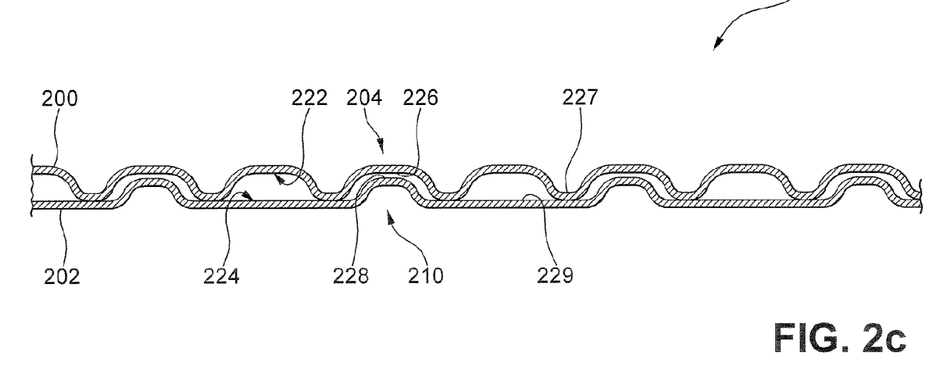

In certain embodiments, at least one of the active areas 204, 210 and the inner surfaces 222, 224 of the unipolar plates 200, 202 have a coating (not shown). The coating may be adapted to provide corrosion resistance, thermal conductivity, and optimized electrical conductivity and contact resistance, for example. In embodiments where the inner surfaces 222, 224 are coated, the coating may facilitate electrical flow formed by metal to metal contact of the respective coatings on each of the inner surfaces 222, 224.

As nonlimiting examples, the coating may include noble metals, metal oxides and combinations thereof. Suitable noble metals for coatings include gold (Au), silver (Ag), iridium (Ir), ruthenium (Ru), rhodium (Rh), osmium (Os), palladium (Pd) and platinum (Pt), for example. In particular embodiments, the metal employed for the coating of the active areas 204, 210 is gold (Au). Suitable metal oxides for the coating include, but are not limited to, hafnium dioxide ($HfO_2$), zirconium dioxide ($ZrO_2$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof. The coatings are typically applied using any commercially available process. As nonlimiting examples, the coatings are applied by one of electroplating, electro-less plating, and physical vapor deposition. It should be understood that other suitable methods for applying the coatings may be used as desired.

In particular embodiments, the coating is hydrophilic and is adapted to facilitate a removal of liquid water from the active areas 204, 210 during operation of the fuel cell stack 2. Suitable hydrophilic coatings may include the noble metal coatings as described herein and as known in the art. The noble metal coating may be applied with the metal oxide coating in a dual coating system, for example. Further suitable hydrophilic coatings are described, for example, in copending U.S. patent application Ser. Nos. 11/068,489, 11/463,386, and 11/463,384, incorporated herein by reference in their entirety. As nonlimiting examples, the coating can include at least one Si—O group, at least one polar group and at least one group including a saturated or unsaturated carbon chain. In further embodiments, the coating comprises at least one Si—O group and an Si—R group, wherein R includes a saturated or unsaturated carbon chain and the molar ratio of Si—R groups to Si—O groups ranges from 1/8 to 1/2. The coating may also be applied by any means sufficient for applying hydrophilic coatings. Suitable hydrophilic coatings can also include nanoparticles having a size ranging from 1 to 100 nanometers, wherein the nanoparticies include a compound having an Si—O group, a saturated or unsaturated carbon chain and a polar group. It should be appreciated that other hydrophilic coatings can also be used.

The hydrophilic coatings may be applied by any suitable method including, but not limited to, brushing, spraying, spreading, coil coating, silk screening, powder coating, and screen printing. Multiple coats of the coating may also be applied as desired.

With renewed reference to FIGS. 2a and 2b, the bipolar plate assembly 8 further includes a plurality of gas ports 212 and a plurality of coolant ports 214 formed in the first unipolar plate 200 and the second unipolar plate 202. The gas ports 212 and the coolant ports 214 cooperate to provide inlet and outlet passages for the fuel, the oxidant, and the coolant to flow through the bipolar plate assembly 8. A skilled artisan should understand that various configurations of the flow channels 206, the lands 208, the gas ports 212, and the coolant ports 214 may be employed as desired. It should also be recognized that the present disclosure is not limited to a particular flow field pattern, but has application to bipolar plate assemblies 8 independent of the type of flow field pattern.

In a further embodiment, the first unipolar plate 200 includes a first perimeter flange 216 and the second unipolar plate 202 includes a second perimeter flange 218. Upon alignment and assembly of the bipolar plate assembly 8, the first perimeter flange 216 and the second perimeter flange 218 cooperate to form a perimeter 220 of the bipolar plate assembly 8.

As best depicted in FIG. 2b and FIG. 2c, the first unipolar plate 200 has a first inner surface 222 disposed on a surface opposite the first active area 204. The second unipolar plate 202 has a second inner surface 224 disposed on a surface opposite the second active area 210. The first inner surface 222 includes a plurality of channels 226 formed therein and defined by a plurality of first lands 227. The second inner surface 224 includes a plurality of lands 228 formed therein and defined by a plurality of second channels 229. The pluralities of channels 226, 229 and the pluralities of lands 227, 228 are adapted to distribute the coolant to the bipolar plate assembly 8, thereby modulating a temperature of the fuel cell stack 2. The first and second inner surfaces 222, 224 form a coolant flowfield 230 in an interior of the bipolar plate assembly 8. It should also be recognized that the present disclosure is not limited to a particular coolant flowfield pattern, but has application to bipolar plate assemblies independent of the coolant flowfield pattern.

Referring to FIG. 2c, the plurality of channels 226 are adapted to mate or "nest" with the plurality of lands 228. The first and second unipolar plates 200, 202 may be welded, for example, via spot or stitch (short linear segment) welds to achieve the mating condition. Pre-nesting as described herein may be employed to militate against gaps between the first and second unipolar plates 200, 202 and enable sufficient welds. Typically, the compression of the bipolar plate assembly 8 in the fuel cell stack 2 is sufficient for the plurality of channels 226 to at least partially nest with the plurality of lands 228. However, a trapped wave may arise when the plurality of channels 226 and the plurality of lands 228 do not nest properly.

The present disclosure includes a method for preparing the bipolar plate assembly 8. In the method of the disclosure, the plurality of channels 226 and the plurality of lands 228 are pre-nested. The method first includes the step of providing the first unipolar plate 200 having the first active area 204. The first unipolar plate 200 includes the plurality of channels 226 formed on the first inner surface 222 of the first unipolar plate 200. The second unipolar plate 202 is also provided, having the second active area 210 with the plurality of lands 228 formed on the second inner surface 224 of the second unipolar plate 202.

The method further includes the steps of aligning the first unipolar plate 200 and the second unipolar plate 202. The first and second unipolar plates 200, 202 may be aligned with a clamping fixture, for example. The first and second unipolar plates 200, 202 are aligned to dispose the first active area 204 adjacent the second active area 210. A first pressure is then applied to the first and second active areas 204, 210 to pre-nest the plurality of channels 226 with the plurality of lands 228. The first pressure may be applied, for example, with at least one of a mechanical force, a hydraulic force, and a magnetic force. It should be appreciated that, during the application of the first pressure, the perimeter flanges 216, 218 of the first and second unipolar plates 200, 202 are not constrained. Any excess or slack material present in the first and second unipolar plates 200, 202 is thereby displaced toward the perimeter 220 of the bipolar plate assembly 8.

Following the pre-nesting of the pluralities of channels and lands 226, 228, the first perimeter flange 216 and the second perimeter flange 218 are constrained and joined. The pre-nested bipolar plate assembly 8 is thereby prepared. In particular embodiments, a substantially hermetic seal is formed by the joining of the first perimeter flange 216 with the second perimeter flange 218. For example, the seal may be formed from a weld, a solder joint, a braze joint, an adhesive, and the like. In a particularly illustrative embodiment, the seal is formed from a weld produced, for example, by one of arc welding, gas welding, resistance welding, energy beam welding such as laser welding and electron beam welding, and solid-state welding. It should be appreciated that the seal may be formed by other suitable means known in the art.

After any excess or slack material is displaced toward the perimeter 220 and the unipolar plates 200, 202 are pre-nested, the unipolar plates 200, 202 may be constrained for purposes of the joining step, for example, by clamping. In another embodiment, the step of constraining the unipolar plates 200, 202 may be performed by spot welding at least one of the first and second active areas 204, 210 and the first and second perimeter flanges 216, 218. The spot welding may be performed by laser welding, for example. Other suitable welding techniques may also be employed for the constraining step prior to joining the first and second perimeter flanges 216, 218. The step of constraining the first and second unipolar plates 200, 202 militates against an undesirable relative movement between the first and second unipolar plates 200, 202 during the joining thereof.

In a further embodiment, the method of the present disclosure may include a step of bonding the first unipolar plate 200 and the second unipolar plate 202. The first and second unipolar plates 200, 202 may be bonded with a plurality of localized electrically conductive nodes (not shown), for example, as disclosed in copending U.S. patent application Ser. No. 11/752,993, incorporated herein by reference in its entirety. The step of bonding the first and second unipolar plates 200, 202 may include spot welding, for example, to form the plurality of electrically conductive nodes. A skilled artisan should appreciate that the pre-nesting of the first and second unipolar plates 200, 202 facilitates the bonding of the first and second unipolar plates 200, 202. In particular, the pre-nesting disposes the plurality of channels 226 and the plurality of lands 228 adjacent one another for bonding. It should also be appreciated that other suitable methods for further bonding the first and second unipolar plates 200, 202 may be employed.

Figure 3:
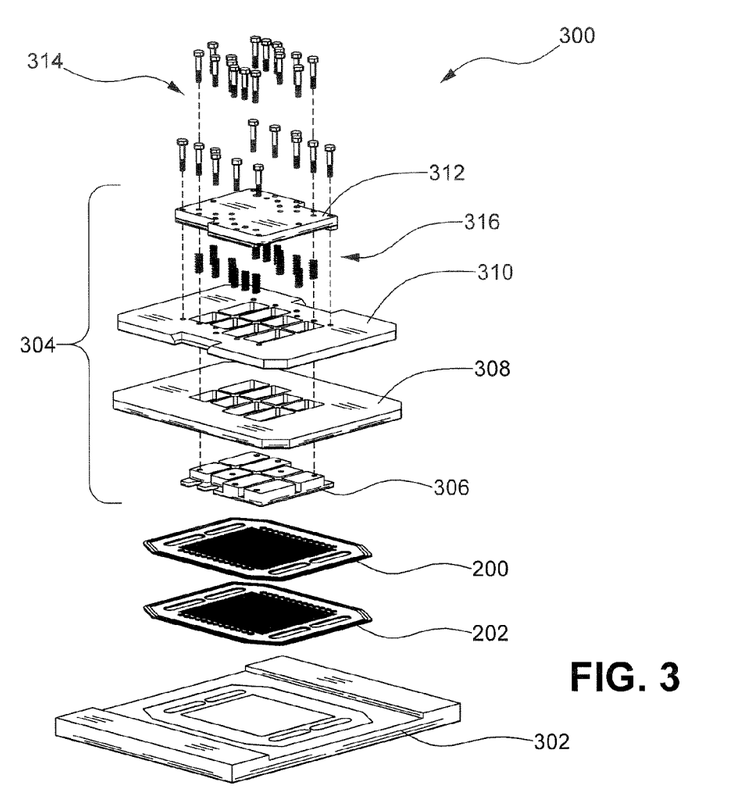
FIG. 3 is a exploded perspective view of an assembly apparatus for fuel cell bipolar plates according to an embodiment of the present disclosure.
Figure 4:
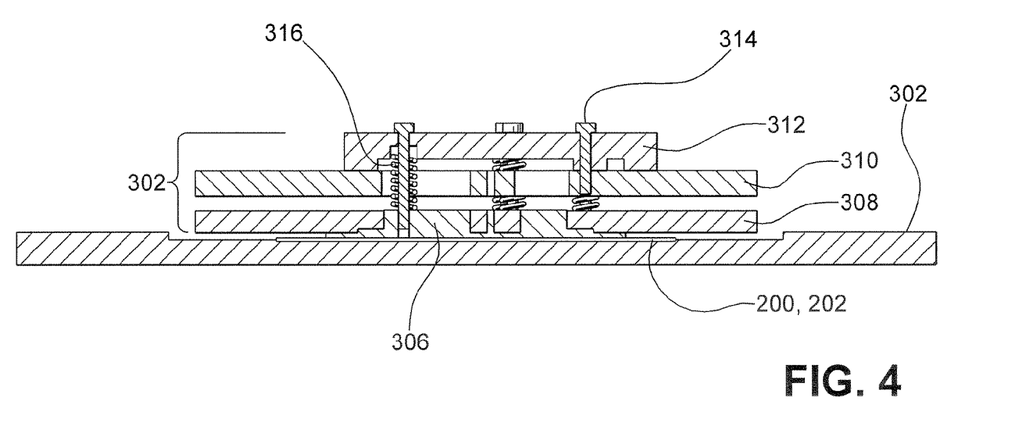
FIG. 4 is a side cross-sectional view of the assembly apparatus shown in FIG. 3.

Referring now to FIGS. 3 and 4, the method for preparing the bipolar plate assembly 8 of the present disclosure may be performed with a clamping fixture 300. The clamping fixture 300 includes a base plate 302. The base plate 302 is adapted to receive the first and second unipolar plates 200, 202. The clamping fixture 300 further includes a top plate assembly 304. The top plate assembly 304 is coupled to the base plate 302 and adapted to apply pressure to the first and second unipolar plates 200, 202 in a stepwise fashion.

The top plate assembly 304 is adapted to provide a first pressure to the active areas 204, 210 of the first and second unipolar plates 200, 202 followed by a second pressure to the perimeter flanges 216, 218. Thus, pressure is applied in a progressive, stepwise manner to the active areas 204, 210. First, the pluralities of channels and lands 226, 228 are pre-nested, and then, the perimeter flanges 216, 218 are joined.

In a particular embodiment, the top plate assembly 304 includes an active area push plate 306, a perimeter push plate 308, a perimeter spring plate 310, and an active area spring plate 312. The active area push plate 306 is adapted to contact the first active area 204 of the first unipolar plate 200. The perimeter push plate 308 is adapted to contact the first perimeter flange 216 of the first unipolar plate 200. In an exemplary operation of the clamping fixture 300, the active area push plate 306 is adapted to contact the first active area 204 of the first unipolar plate 200 before the perimeter is contacted with the perimeter push plate 308. Thus, the pluralities of channels and lands 226, 228 may be pre-nested and any excess or slack material may be displaced away from the active areas 204, 210 of the first and second unipolar plates 200, 202.

The active area spring plate 312 may be coupled to the active area push plate 306 and adapted to transfer the first pressure thereto. The perimeter spring plate 310 may be coupled to the perimeter push plate 308 and adapted to transfer the second pressure thereto. The top plate assembly 304 may further include a plurality of bolts 314 for coupling at least one of the active area spring plate 312 to the active area push plate 306 and the perimeter spring plate 310 to the perimeter push plate 308. The plurality of bolts 314 may further be employed to couple the active area spring plate 312 and the perimeter spring plate 308.

In a further embodiment, the top plate assembly 304 includes a plurality of springs 316 disposed between the active area spring plate 312 and the active area push plate 306. In certain embodiments, at least one of the plurality of springs 316 may be disposed around at least one of the plurality of bolts 314. As a nonlimiting example, at least a portion of the plurality of springs 316 may be configured to transfer the first pressure from the active area spring plate 312 to the active area push plate 306. In a further nonlimiting example, at least another portion of the plurality of springs 316 may be configured to transfer the second pressure from the perimeter spring plate 310 to the perimeter push plate 308. Other suitable configurations for transferring the first and second pressures to the active area push plate 306 and the perimeter push plate 308 may be selected as desired.

Figure 5:
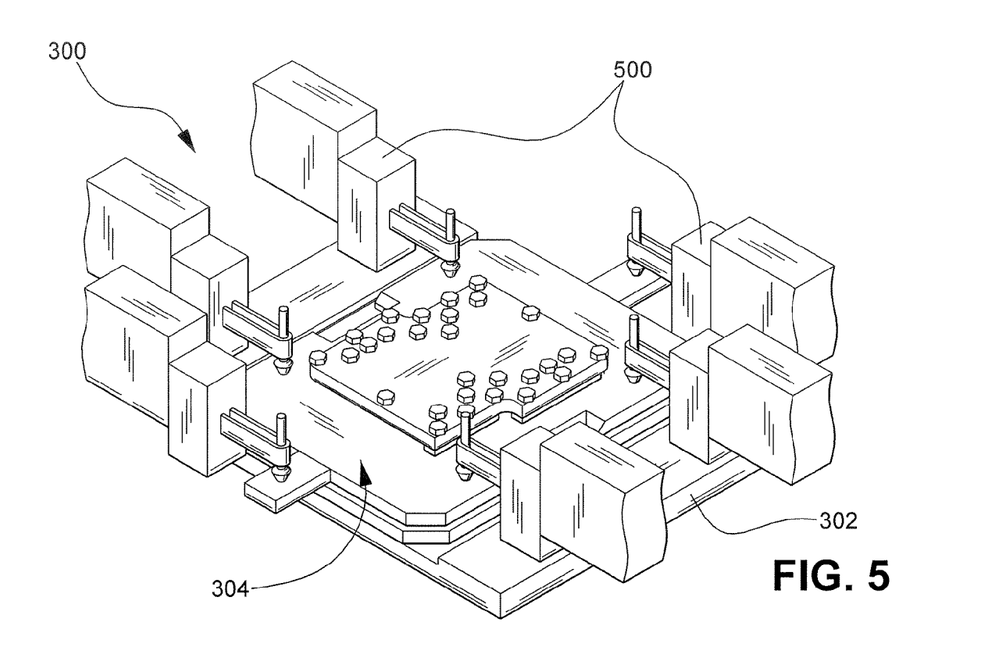
FIG. 5 is a perspective view of the assembly apparatus shown in FIG. 3.

As shown in FIG. 5, the clamping fixture 300 may also include at least one clamping device 500. The clamping device 500 is coupled to the base plate 302 and adapted to compress the top plate assembly 304 against the base plate 302. For example, the clamping device 500 may include at least one of a mechanical clamp, a pneumatic clamp, a hydraulic clamp, and a magnetic clamp. In a particular embodiment, the clamping device 500 is at least one of dead weights and a toggle clamp. In one embodiment, the first pressure may be applied first, for example, with dead weights to displace the trapped wave of material away from the active areas 204, 210. The first pressure may then be increased, for example, with toggle clamps to a level sufficient to pre-nest the unipolar plates 200, 202. In another embodiment, pneumatic clamps are employed to provide the first pressure sufficient to both displace the trapped wave of material away from the active areas 204, 210 and pre-nest the unipolar plates 200, 202.

It should be appreciated that the clamping device 500 may provide both the first and second pressures applied by the active area push plate 306 and the perimeter push plate 308, respectively, to the unipolar plates 200, 202. The first and second unipolar plates 200, 202, when disposed between the base plate 302 and the top plate assembly 304 of the present disclosure, are thereby pre-nested.

EXAMPLE

As can be observed in TABLES I and II, thickness measurements were obtained from sample bipolar plate assemblies manufactured according to the method of the present disclosure. Variation in thickness from a desired thickness of the sample bipolar plate assemblies was recorded. It should be appreciated that the present disclosure is not limited by the samples described.

TABLE I

Control Plate Thickness Variation Measurements (mm)

| Location | No. 1 | No. 2 | No. 3 | No. 4 | No. 5 | No. 6 |
|---|---|---|---|---|---|---|
| 11 | 0.070 | 0.047 | 0.092 | 0.038 | 0.087 | 0.070 |
| 12 | 0.032 | 0.000 | 0.054 | 0.010 | 0.055 | 0.015 |
| 13 | 0.012 | −0.003 | 0.049 | 0.008 | 0.034 | 0.008 |
| 14 | 0.066 | 0.043 | 0.064 | 0.013 | 0.049 | 0.063 |
| 15 | 0.011 | −0.004 | 0.013 | 0.008 | 0.006 | −0.001 |
| 16 | 0.002 | −0.012 | 0.001 | 0.024 | −0.002 | −0.008 |
| 17 | 0.065 | 0.048 | 0.087 | 0.040 | 0.080 | 0.081 |
| 18 | 0.011 | −0.004 | 0.023 | 0.005 | 0.018 | 0.007 |
| 19 | −0.003 | −0.014 | 0.014 | −0.001 | −0.001 | −0.001 |
| 20 | 0.021 | 0.014 | 0.052 | 0.014 | 0.051 | 0.036 |
| 21 | 0.001 | −0.009 | 0.005 | 0.003 | 0.000 | −0.010 |
| 22 | 0.001 | −0.009 | 0.008 | 0.019 | 0.002 | −0.009 |
| 23 | 0.037 | 0.029 | 0.060 | 0.012 | 0.048 | 0.065 |
| 24 | −0.003 | −0.013 | 0.008 | −0.001 | −0.002 | 0.022 |
| 25 | −0.004 | −0.013 | 0.006 | 0.001 | −0.002 | 0.024 |
| 40 | 0.080 | 0.042 | 0.096 | 0.026 | 0.091 | 0.073 |
| 41 | 0.054 | 0.002 | 0.069 | 0.010 | 0.070 | 0.030 |
| 42 | 0.046 | 0.007 | 0.067 | 0.016 | 0.056 | 0.039 |
| 43 | 0.027 | 0.025 | 0.058 | 0.016 | 0.038 | 0.070 |
| 44 | −0.006 | −0.016 | 0.008 | 0.000 | −0.003 | 0.022 |
| 45 | 0.009 | 0.002 | 0.023 | 0.013 | 0.013 | 0.049 |
| MAX | 0.080 | 0.048 | 0.096 | 0.040 | 0.091 | 0.081 |
| MIN | −0.006 | −0.016 | 0.001 | −0.001 | −0.003 | −0.010 |
| AVG | 0.025 | 0.008 | 0.041 | 0.013 | 0.033 | 0.031 |
| RANGE | 0.086 | 0.064 | 0.095 | 0.041 | 0.094 | 0.091 |

Six control bipolar plates were prepared by clamping a pair of unipolar plates 200, 202 with matching pluralities of channels and lands 226, 228 at the perimeter flanges 216, 218 of the unipolar plates 200, 202. A pressure was then applied to the perimeter flanges 216, 218 of the unipolar plates with dead weights and clamps. The perimeter flanges 216, 218 were then welded to seal and form the control bipolar plates.

Figure 6:
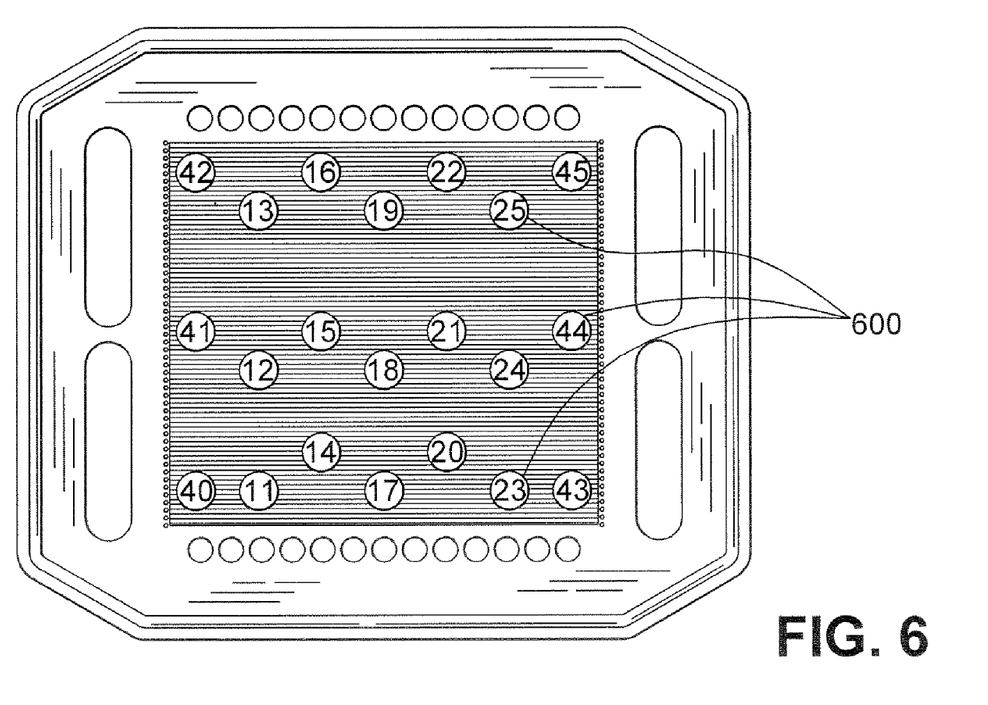
FIG. 6 is a top plan view of a bipolar plate assembly having locations across an active area thereof identified for measurement of the bipolar plate thickness.

The control bipolar plates underwent a break-in period in a fuel cell stack for about 1900 hours with no additional load applied. Following the break-in period, thickness measurements were performed at various locations 600 across the control bipolar plates with a dial indicator. The various measurement locations 600 were numbered as shown in FIG. 6.

As illustrated in TABLE I, the thickness range of the control bipolar plates produced according to known methods was between about 0.041 mm and 0.091 mm.

TABLE II

Sample Plate Thickness Variation Measurements (mm)

| Location | No. 1 | No. 2 | No. 3 | No. 4 | No. 5 | No. 6 |
|---|---|---|---|---|---|---|
| 11 | 0.011 | 0.006 | 0.008 | 0.007 | 0.006 | 0.013 |
| 12 | −0.004 | −0.007 | −0.003 | −0.007 | −0.008 | −0.007 |
| 13 | −0.008 | −0.010 | −0.009 | −0.010 | −0.009 | −0.008 |
| 14 | 0.001 | −0.001 | 0.003 | 0.003 | −0.001 | −0.001 |
| 15 | −0.009 | −0.009 | 0.004 | −0.009 | −0.009 | −0.001 |
| 16 | 0.023 | 0.011 | 0.014 | 0.005 | 0.006 | 0.016 |
| 17 | 0.010 | 0.008 | 0.005 | 0.010 | 0.010 | 0.014 |
| 18 | −0.005 | −0.005 | −0.005 | −0.007 | −0.010 | −0.006 |
| 19 | 0.000 | −0.003 | 0.002 | −0.002 | 0.000 | −0.002 |
| 20 | 0.002 | 0.002 | 0.005 | 0.002 | −0.002 | 0.002 |
| 21 | −0.005 | −0.007 | −0.001 | −0.008 | −0.010 | −0.005 |
| 22 | 0.028 | 0.022 | 0.021 | 0.014 | 0.026 | 0.014 |
| 23 | −0.005 | −0.002 | −0.003 | −0.004 | −0.006 | −0.005 |
| 24 | −0.002 | −0.004 | −0.001 | −0.004 | −0.006 | −0.004 |
| 25 | −0.007 | −0.008 | −0.006 | −0.009 | −0.010 | −0.010 |
| 40 | 0.008 | 0.007 | 0.009 | 0.004 | 0.006 | 0.006 |
| 41 | 0.006 | 0.003 | 0.012 | 0.007 | 0.005 | 0.007 |
| 42 | 0.013 | 0.016 | 0.014 | 0.010 | 0.012 | 0.010 |
| 43 | 0.007 | 0.010 | 0.009 | 0.007 | 0.006 | 0.006 |
| 44 | 0.000 | −0.003 | 0.003 | −0.001 | −0.003 | −0.001 |
| 45 | 0.007 | 0.005 | 0.009 | 0.006 | 0.005 | 0.005 |
| MAX | 0.028 | 0.022 | 0.021 | 0.014 | 0.026 | 0.016 |
| MIN | −0.009 | −0.010 | −0.009 | −0.010 | −0.010 | −0.010 |
| AVG | 0.003 | 0.001 | 0.004 | 0.001 | 0.000 | 0.002 |
| RANGE | 0.037 | 0.032 | 0.030 | 0.024 | 0.036 | 0.026 |

Six sample bipolar plates were prepared according to the method of the present disclosure. A pair of unipolar plates 200, 202 with matching pluralities of channels and lands 226, 228 were pre-nested with dead weights and clamps. Following the pre-nesting, the unipolar plates were constrained at the perimeter flanges 216, 218 with clamps. The perimeter flanges 216, 218 were then welded to seal and form the sample bipolar plates.

In a manner similar to the control bipolar plates, the sample bipolar plates underwent a break-in period in a fuel cell stack for about 1900 hours with no additional load applied. Following the break-in period, thickness measurements were performed with a dial indicator at the various FIG. 6 locations across the sample bipolar plates.

As illustrated in TABLE II, the range in thickness of the sample bipolar plates produced according to the method of the disclosure varied between about 0.024 mm and 0.037 mm for the six samples measured. The variation in thickness across the sample bipolar plates having been pre-nested was thereby shown to be surprisingly lower than the variation in thickness across the control bipolar plates. It should be understood that bipolar plates assemblies 8 prepared according to the method of the present disclosure may therefore provide improved performance over bipolar plate assemblies 8 manufactured according to known methods of the art.

The method and clamping fixture 300 of the present disclosure advantageously provide a pre-nesting of the first and second unipolar plates 200, 202 during the preparation of the bipolar plate assembly 8. The method and clamping fixture 300 militate against the presence of the trapped wave in the active areas 204, 210 by displacing excess or slack material away from the active areas 204, 210 prior to constraining the perimeter flanges 216, 218 for joining. The method and clamping fixture 300 reduce a variation in thickness of the bipolar plate assembly 8, and thereby further militate against undesirable localized concentrations of compressive force in the fuel cell stack 2 in operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for preparing a bipolar plate assembly for a fuel cell stack, comprising the steps of:
   providing a first unipolar plate having a first active area with a plurality of channels formed on a first inner surface thereof and a first perimeter flange;
   providing a second unipolar plate having a second active area with a plurality of lands formed on a second inner surface thereof and a second perimeter flange;
   aligning the first unipolar plate and the second unipolar plate to dispose the first active area adjacent the second active area;
   applying a first pressure directly to the first and second active areas to pre-nest the first unipolar plate and the second unipolar plate; and
   joining the first perimeter flange of the first unipolar plate to the second perimeter flange of the second unipolar plate.

2. The method of claim 1, further comprising a step of constraining the first unipolar plate and the second unipolar plate after the pre-nesting of the first unipolar plate and the second unipolar plate.

3. The method of claim 2, wherein the first and second unipolar plates are constrained by applying a second pressure to the first and second perimeter flanges to militate against a relative movement between the first and second unipolar plates.

4. The method of claim 1, wherein an excess plate material is displaced to at least one of the first and second perimeter flanges during the step of applying the first pressure to the first and second active areas.

5. The method of claim 1, wherein the pressure is applied to the first and second active areas with at least one of a mechanical force, a pneumatic force, a hydraulic force, and a magnetic force.

6. The method of claim 1, wherein a substantially hermetic seal is formed by the joining of the first perimeter flange and the second perimeter flange.

7. The method of claim 6, wherein the seal is formed from one of a weld, a solder joint, a braze joint, and an adhesive.

8. The method according to claim 7, wherein the weld is formed by one of arc welding, gas welding, resistance welding, energy beam welding, and solid-state welding.

9. The method according to claim 8, wherein the energy beam welding includes one of laser welding and electron beam welding.

10. The method of claim 1, wherein the first and second unipolar plates are aligned with a clamping fixture.

11. The method of claim 1, further comprising the step of bonding the first unipolar plate and the second unipolar plate with a plurality of localized electrically conductive nodes.

12. The method of claim 11, wherein the step of bonding the first unipolar plate and the second unipolar plate includes spot welding to form the localized electrically conductive nodes.

* * * * *